(12) United States Patent
Przybysz et al.

(10) Patent No.: US 10,647,837 B2
(45) Date of Patent: May 12, 2020

(54) COMPATIBILISED POLYOLEFIN AND POLYCARBONATE COMPOSITION

(71) Applicant: SABIC GLOBAL TECHNOLOGIES B.V., Bergen op Zoom (NL)

(72) Inventors: Marta Urszula Przybysz, Geleen (NL); Mateusz Krzysztof Kozak, Geleen (NL); Robbert Duchateau, Eindhoven (NL); Lidia Jasinska-Walc, Eindhoven (NL); Miloud Bouyahyi, Eindhoven (NL)

(73) Assignee: SABIC Global Technologies B.V., Bergen op Zoom (NL)

(*) Notice: Subject to any disclaimer, the term of this patent is extended or adjusted under 35 U.S.C. 154(b) by 59 days.

(21) Appl. No.: 16/060,203

(22) PCT Filed: Nov. 28, 2016

(86) PCT No.: PCT/EP2016/078976
§ 371 (c)(1),
(2) Date: Jun. 7, 2018

(87) PCT Pub. No.: WO2017/097617
PCT Pub. Date: Jun. 15, 2017

(65) Prior Publication Data
US 2018/0362747 A1    Dec. 20, 2018

(30) Foreign Application Priority Data

Dec. 9, 2015  (EP) .................................... 15198661
Jun. 24, 2016 (EP) .................................... 16176123
Jun. 28, 2016 (EP) .................................... 16176642

(51) Int. Cl.
*C08L 23/10*        (2006.01)
*C08L 53/00*        (2006.01)
(Continued)

(52) U.S. Cl.
CPC ............... *C08L 23/12* (2013.01); *C08L 23/02* (2013.01); *C08L 23/16* (2013.01); *C08L 51/06* (2013.01);
(Continued)

(58) Field of Classification Search
CPC ....... C08L 53/00; C08L 69/00; C08L 2205/03
See application file for complete search history.

(56) References Cited

U.S. PATENT DOCUMENTS 5,130,371 A * 7/1992 Fujita .................. C08F 8/00
                                                 525/186
5,618,599 A * 4/1997 Nulman ................ B32B 27/08
                                                 428/36.7

(Continued)

FOREIGN PATENT DOCUMENTS

WO     2014178972 A2    11/2014

OTHER PUBLICATIONS

Chung et al., Macromolecules 1994, 27, 1313-1319.*
(Continued)

*Primary Examiner* — Vu A Nguyen
(74) *Attorney, Agent, or Firm* — Cantor Colburn LLP

(57) ABSTRACT

The present invention relates to a composition comprising a polyolefin, polycarbonate and a compatibiliser, articles made therefrom and the use of a graft or block copolymer as a compatibiliser.

16 Claims, 1 Drawing Sheet

1

2

3

(51) Int. Cl.
  *C08L 67/04* (2006.01)
  *C08L 69/00* (2006.01)
  *C08L 23/12* (2006.01)
  *C08L 23/02* (2006.01)
  *C08L 23/16* (2006.01)
  *C08L 51/06* (2006.01)

(52) U.S. Cl.
  CPC ............... *C08L 53/00* (2013.01); *C08L 67/04* (2013.01); *C08L 69/00* (2013.01); *C08L 2203/16* (2013.01); *C08L 2205/03* (2013.01); *C08L 2205/08* (2013.01); *C08L 2207/02* (2013.01); *C08L 2207/062* (2013.01); *C08L 2207/064* (2013.01); *C08L 2207/066* (2013.01)

(56) References Cited

U.S. PATENT DOCUMENTS

2003/0055179 A1* 3/2003 Ota .................... B32B 27/32
                                                   525/242
2010/0210778 A1   8/2010 Lakeman et al.

OTHER PUBLICATIONS

Han et al., Macromolecules 2002, 35, 8923-8925.*
International Search Report for International Application No. PCT/EP2016/078976; International Filing Date: Nov. 28, 2016; dated Jan. 23, 2017; 5 Pages.
Written Opinion of the International Searching Authority for International Application No. PCT/EP2016/078976; International Filing Date: Nov. 28, 2016; dated Jan. 23, 2017; 6 Pages.

* cited by examiner

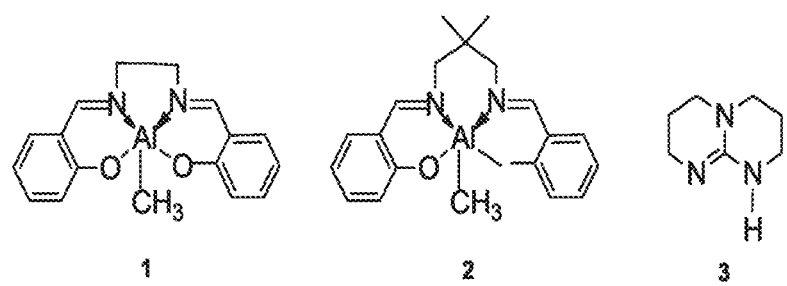

COMPATIBILISED POLYOLEFIN AND POLYCARBONATE COMPOSITION

CROSS REFERENCE TO RELATED APPLICATIONS

This application is a 371 of International Application No. PCT/EP2016/078976, filed Nov. 28, 2016, which claims priority to European Application Serial Nos. 16176642.3 filed Jun. 28, 2016, 16176123.4 filed Jun. 24, 2016 and 15198661.9 filed Dec. 9, 2015 which are incorporated herein by reference in their entirety.

The present invention relates to a composition comprising a polyolefin, polycarbonate and a compatibiliser, articles made therefrom and the use of a graft or block copolymer as a compatibiliser.

Compositions of a polyolefin and a polycarbonate are desirable as they potentially allow tuning of the material properties by selecting the type and amounts of the individual components. However, it is well known that polyolefins and polycarbonates are immiscible. It is further a disadvantage that polyolefins and polycarbonates substantially do not interact so that a blend of a polyolefin and a polycarbonate generally results in a two-phase system having a polyolefin phase and a polycarbonate phase with poor physical properties. In addition, polymer blends of incompatible polymers may be very sensitive to processing conditions, so that implementing them on a commercial scale may get even more difficult.

Accordingly, attempts have been made to increase the interaction between the phases in such blends by adding a compatibiliser. Compatibilisers are materials that have affinity with both phases and enhance the bonding strength. As a result a material with improved properties can be obtained.

Compatibilisers for blends of polyolefins and polycarbonates are known in the art. For example WO2014178972 discloses block copolymers comprising a polyolefin block and an aliphatic polycarbonate block and their use a compatibilisers for polymer blends. These block copolymers can be obtained by using a polyolefin block with a single alcohol or acid functionality at the chain end to copolymerize epoxides and carbon dioxide. However, this preparation process is quite complex and inconvenient, especially as the second block is obtained by copolymerisation using epoxides, which are quite dangerous.

In view of the ever increasing needs for better materials properties, there is a continuous need for further blends that can be manufactured relatively easy and at low cost.

It is therefore an object of the present invention to provide for a composition comprising a polyolefin and a polycarbonate, which is easy to process and allows tuning the properties to get for example a good balance of mechanical properties and/or chemical properties and/or good acoustic properties.

Accordingly, the present invention relates to a composition comprising a polyolefin, a polycarbonate and a compatibiliser, wherein said compatibiliser is a block or graft copolymer comprising a polyolefin part, especially a polyolefin block, and a polyester part, especially a polyester block, said polyester part being for example a non-aromatic polyester and/or having an average M/F ratio $\geq 2$ and $\leq 25$, wherein M is the number of backbone carbon atoms in the polyester not including the carbonyl carbons and F is the number of ester groups in the polyester.

The present inventors have found that, preferably non-aromatic, polyesters having an average M/F ratio $\geq 2$ and $\leq 25$ or $\leq 10$, wherein M is the number of backbone carbon atoms in the polyester not including the carbonyl carbons and F is the number of ester groups in the polyester, may, at least in part, be miscible with aliphatic and/or aromatic polycarbonates. When two or more different esters/lactones are used in the polyester, the average M/F ratio may be obtained by calculating the M/F ratio for each ester/lactone and then calculating the average of the values obtained for the different esters/lactones and/or the M/F ratio may be determined by NMR, especially by adding the integrations corresponding to backbone carbon atoms and dividing the result by the added integrations corresponding to the carbon atoms of the ester functions. The present inventors could also confirm that the polyolefin block interacts with the polyolefins, as expected. Accordingly, the present inventors found that a block copolymer as herein acts as a compatibiliser in a blend of a polyolefin and a polycarbonate and further observed that the properties of the polyolefin-polycarbonate blends are improved by addition of a relatively small amount of the compatibiliser as herein defined. This may lead to improved dimensional stability and/or improved heat resistance and/or improved stiffness and/or improved adhesion to other materials, such as for example glass and/or inorganic fillers, and/or improved surface properties, such as for example improved paintability, improved printability, improved anti-fogging, improved anti-static properties, of a material with a polyolefin matrix. This may also lead to improved chemical resistance and/or improved acoustic properties for example by reduced squeaking and/or rattling and/or reduced weight and/or improved flow of material with a polycarbonate matrix. Further, since the polyester compatibiliser and the polycarbonate will introduce a certain polarity in the material the printability is improved such that pre-treatment prior to printing can be avoided or is at least reduced in intensity.

By application of the invention at least some of the aforementioned objects are met.

Compatibiliser

A polymer block may be a part of a block copolymer or graft polymer having a given composition and that differs from another part of that block copolymer or graft polymer by at least one property. A block may preferably for example be a segment of a linear polymer, especially a linear block copolymer, a backbone of a graft polymer and/or a graft of a graft polymer.

The compatibiliser has a weight average molecular weight (Mw) of for example from 1,000 to 250,000 g/mol, preferably 50,000 to 225,000 g/mol.

Polyester Block

The polyester block in the compatibiliser of the composition according to the present invention may have an average M/F ratio $\geq 2$ and $\leq 25$ or preferably $\leq 10$, wherein M is the number of backbone carbon atoms in the polyester not including the carbonyl carbons and F is the number of ester groups in the polyester. With average M/F ratio is meant a numerical average. The M/F ratio may also be $\geq 3$ or $>3$ or $\geq 4$ or $>4$ and/or $\leq 9$ or $<9$ or $\leq 8$ or $<8$ or $\leq 7$ or $<7$ or $\leq 6$ or $<6$. A preferred range for the M/F ratio in the polyester block may be for example $\geq 2$ and $\leq 8$, alternatively $>2$ and $<8$, alternatively $\geq 2$ and $\leq 7$, alternatively $>2$ and $<7$, alternatively $>3$ and $\leq 8$, alternatively $>3$ and $<8$, alternatively $\geq 3$ and $\leq 7$, alternatively $>3$ and $<7$, alternatively $\geq 4$ and $\leq 8$, alternatively $>4$ and $<8$, alternatively $\geq 4$ and $\leq 7$ or alternatively $>4$ and $<7$.

The polyester may be for example non-aromatic, which may mean that the polyester does not contain aromatic groups. Alternatively, the polyester may be semi-aromatic, which may mean that it comprises both aromatic and aliphatic segments.

The backbone of the polyester can be saturated meaning it preferably does not contain any double bonds. It is preferred that the backbone of the polyester is aliphatic. The polyester backbone may alternatively comprise short, linear or branched, aliphatic branches such as methyl, ethyl, propyl, butyl, pentyl or hexyl branches. The backbone may also contain one or more heteroatoms such as oxygen, nitrogen or sulphur. It is preferred that the backbone of the polyester is for example based on methylene units, i.e. that the ester groups are linked via unbranched aliphatic groups.

The polyester may be a polyester homopolymer or a polyester copolymer composed for example of different monomers, i.e. different diols, diacids, hydroxyacids, lactones also including for example dilactones and/or oligolactones, the combination of epoxides and anhydrides and/or $CO_2$, or (cyclic) carbonates which can be either aliphatic or aromatic. Instead of diacids and/or hydroxyacids, their corresponding diesters and/or hydroxyesters, especially for example dimethyl esters and hydroxymethylester, respectively, can be used to form the polyesters, especially by transesterification, as well.

A polyester according to the invention may thereby also be a polyester-ether, which may comprise both ester and ether functionalities, or an polyester-carbonate, which may comprise both carboxylic acid ester functionalities and carbonylic acid ester (carbonate) functionalities.

Typical examples of polyester homopolymers include the homopolymers obtainable by the ring-opening polymerisation (ROP) of for example β-butyrolactone, glycolide, L-lactide, ε-caprolactone, cyclic butylene adipate or cyclic ethylene brassylate.

Typical examples of polyester copolymers include copolymers of at least two lactones from a group including for example β-butyrolactone, glycolide, L-lactide, ε-caprolactone, cyclic butylene adipate and cyclic ethylene brassylate.

Other typical examples of polyester copolymers may include AB type copolyesters prepared for example using one or more $C_2$-$C_{32}$ hydroxy acids and/or a combination of one or more hydroxy acids and one or more cyclic esters (especially such as for example the ones mentioned above), provided the polyester has an average M/F (as defined herein) ≥2 and ≤10. The term $C_x$-$C_y$ hydroxy acid may thereby refer to a range regarding the amount of carbon atoms in the hydroxy acid, so that $C_2$-$C_{32}$ hydroxy acids for example means a range of two to thirty two carbon atoms in the hydroxy acid.

Other typical examples of polyester copolymers include AABB type copolyesters prepared of a combination of $C_2$-$C_{30}$ diols and $C_2$-$C_{32}$ diacids and/or a combination of epoxides and anhydrides, provided the polyester copolymer has an average M/F (as defined herein) ≥2 and ≤10. The term $C_x$ refers to the amount of carbon atoms x in the diol or diacid, respectively.

Diacids include but are not limited to for example oxalic acid, malonic acid, succinic acid, glutaric acid, adipic acid, heptanedioic acid, octanedioic acid, nonanedioic acid and their unsaturated and branched analogues. The diols include but are not limited to for example ethylene glycol, propanediol, butanediol, pentanediol, hexanediol, octanediol, decanediol. The diacids and diols might comprise short, linear or branched, aliphatic branches such as methyl, ethyl, propyl, butyl, pentyl or hexyl branches. The diols and diacids might also contain a heteroatom like an oxygen, nitrogen or sulfur. Instead of diacids, their corresponding diesters, especially for example dimethyl esters, can be used as well. Epoxides include but are not limited to ethylene oxide, propylene oxide, butylene oxide, cyclohexene oxide, 4-vinyl-cyclohexene oxide, limonene oxide, and anhydrides include but are not limited to phthalic anhydride, succinic anhydride and maleic anhydride.

Instead of a combination of one or more diol and diacid, cyclic dilactones and/or a combination of epoxides and anhydrides can also be added to produce AABB copolyesters with the desired M/F (as defined herein) ≥2 and ≤10. Typical examples of cyclic dilactones are: ethylene adipate, ethylene brassylate, butylene adipate.

Another type of polyester copolymers include AB/AABB copolyesters which can for example be prepared of a combination of lactones and/or hydroxyacids and dilactones and/or the combination of $C_2$-$C_{30}$ diols and $C_2$-$C_{32}$ diacids and/or a combination epoxides and anhydrides, which result in polyesters having an average M/F (as defined herein) ≥2 and ≤10.

Preferably the polyester or copolyester is selected for example from poly(ε-caprolactone) and/or poly(ethylene brassylate).

More in general the polyester or copolyester may be for example of a general structure

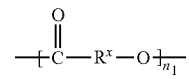

wherein
$R^x$ is an organic group, preferably an aliphatic group having an average length of ≥2 and ≤10 carbon atoms and $n_1$ is the number of repeating units, which generally is at least 25, preferably at least 50 such as at least 100, at least 300, at least 400. The number of repeating units n1 is preferably at most 2000, such as at most 1000, 600 or 500.

Organic group $R^x$ is a branched or straight hydrocarbon group optionally containing one or more heteroatoms provided that the atom neighbouring the —O— is a carbon atom, i.e. not a heteroatom. $R^x$ may contain one or more unsaturations, like —C═C—. Preferably $R^x$ is a branched or straight hydrocarbon group, more preferably $R^x$ is a branched or straight aliphatic group. $R^x$ is preferably a saturated aliphatic group. In that respect the term chain length as used herein refers to the shortest number of atoms between two ester functionalities (O═)C—O—. Hence the "chain length" does not include any optional branches or side groups. For example, if $R^x$ is ($C_4H_8$) the chain length is four. Similarly, if $R^x$ is $CH_2$—$C(CH_3)_2$—$CH_2$—$CH_2$ the chain length is also four. In the general formula above $R^x$ may be the same or different throughout the polyester provided the average chain length is ≥2 and ≤10 carbon atoms. The following general (co)polyester structures can be considered, which structures are more detailed embodiments of the general structure provided above:

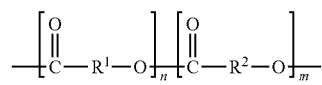

AB type copolyester

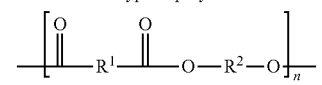

AABB type copolyester

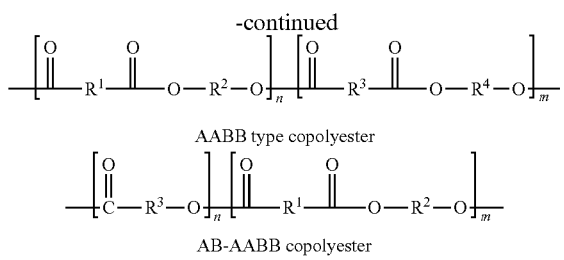

AABB type copolyester

AB-AABB copolyester

The chain lengths of $R^1$, $R^2$, $R^3$ and $R^4$ are selected such that for the polyester the M/F ratio (as defined herein) is ≥2 and ≤10. The description for $R^x$ above also applies for $R^1$-$R^4$.

The average M/F ratio (as defined herein) may preferably for example be ≤25, ≤20, ≤15, ≤10 or ≤9 or ≤8 or ≤7. Accordingly the M/F ratio (as defined herein) may be for example ≥2 or ≥3 or ≥4 or >6.

Polycarbonate Block

The polycarbonate block in the compatibiliser of the composition according to the present invention may have an average M/F ratio ≥2 and ≤25, wherein M is the number of backbone carbon atoms in the polycarbonate not including the carbonyl carbons and F is the number of carbonate groups in the polycarbonate. With average M/F ratio is meant a numerical average. The M/F ratio may also be ≥3 or >3 or ≥4 or >4 and/or ≤9 or <9 or ≤8 or <8 or ≤7 or <7 or ≤6 or <6. A preferred range for the M/F ratio in the polycarbonate block may be for example ≥2 and ≤8, alternatively >2 and <8, alternatively ≥2 and ≤7, alternatively >2 and <7, alternatively ≥3 and ≤8, alternatively >3 and <8, alternatively ≥3 and ≤7, alternatively >3 and <7, alternatively ≥4 and ≤8, alternatively >4 and <8, alternatively ≥4 and ≤7 or alternatively >4 and <7.

For a polycarbonate block according to the invention for example cyclic carbonic acid esters, and/or a combination of epoxides and $CO_2$, can also be used as monomer or as comonomer in combination with lactones, dilactones, hydroxy acids (or their corresponding esters, especially for example methyl esters) or diols plus dicarboxylic acids (or their corresponding diesters, especially for example dimethyl esters) or a combination of these monomers to form polycarbonates or poly(ester-co-carbonate)s with an average M/F (as defined herein) ≥2 and ≤10. Examples of cyclic carbonic acid esters are trimethylene carbonate and decamethylene carbonate. Epoxides include but are not limited to ethylene oxide, propylene oxide, butylene oxide, cyclohexene oxide, 4-vinyl-cyclohexene oxide and limonene oxide.

A polycarbonate block according to present invention may be a linear polymer obtained by polycondensation of a carbonate or other carbonylic reagent such as phosgene or triphosgene with a diol, especially for example a bisphenol.

A polycarbonate block according to present invention may also comprise ester functionalities and/or (silyl) ether functionalities and/or unsaturations.

A polycarbonate block according to present invention may especially for example be obtained by polycondensation of bisphenol A with a carbonate or phosgene. An accordingly obtained polycarbonate block may comprise aromatic structures from the phenol. A polycarbonate block comprising aromatic structure may thereby be called aromatic polycarbonate.

On the other hand, a polycarbonate block may also not comprise aromatic structures. In such cases, a polycarbonate block may be called aliphatic polycarbonate block and may especially be obtained by ROP of cyclic carbonic acid esters and/or by the copolymerisation of epoxides and $CO_2$. Moreover, a polycarbonate block may also be semi-aromatic, which may mean it comprises both aliphatic and aromatic structures coming from different diols.

Polyolefin Block

The polyolefin block in the compatibiliser of the composition according to the present invention may be for example be a propylene homopolymer or a propylene copolymer containing at least 90 wt. % of propylene on the basis of the weight of the polypropylene block. Comonomers may be ethylene or C3-C8 α-olefins, preferably ethylene. Preferably the amount of comonomer is at most 5 wt. %, more preferably at most 2 wt. %. If the amount of comonomer is too high the material may become fully amorphous which from a viewpoint of mechanical properties may not be desirable in certain applications.

Alternatively, the polyolefin block in the compatibiliser of the composition according to the present invention may be for example an ethylene homopolymer or an ethylene copolymer containing at least 90 wt. % of ethylene on the basis of the weight of the polyethylene block. Comonomers may be ethylene or C3-C8 α-olefins, preferably for example propylene, C6 α-olefins or C8 α-olefins. By expressions like for example C3-C8 α-olefins or C6 α-olefins, respectively α-olefins with 3 to 8 carbon atoms or α-olefins with 6 carbon atoms are meant. Preferably the amount of comonomer is at most 5 wt. %, more preferably at most 2 wt. %.

The polyolefin block may for example be polyethylene, especially for example VLDPE, LLDPE, LDPE, HDPE, or polypropylene, especially polypropylene homopolymer, especially isotactic polypropylene homopolymer, and/or a polypropylene copolymer, especially for example comprising between 0.5 and 5 wt. % of ethylene and/or another alpha-olefin.

Type of Block Copolymer

The block copolymer according to the present invention is preferably of the type AB or BAB with A representing polyolefin and B representing polyester.

The block copolymer may also be a graft copolymer of structure $AB_n$ having a polyolefin backbone with n polyester branches grafted thereon, n being at least 1. For graft copolymers the backbone may be considered as the polyolefin block. The grafts may represent other polymer blocks. In the sense of the invention, a graft copolymer may thus be a type of block copolymer. The amount of grafts per 1000 main chain carbon atoms may be for example >0 and <10, preferably <5, further preferred <2 or even further preferred <1. The number of grafts may not be too high because otherwise the polypropylene backbone will not interact sufficiently with the polypropylene phase in the composition.

In an embodiment where a block copolymer contains two or more B (i.e. polyester) blocks these B blocks may be the same or different in length, i.e. may have the same or different molecular weight, depending on the conditions of the process to manufacture the block copolymer.

The weight average molecular weight of the block copolymer used in the composition as compatibiliser is for example from 5,000 to 250,000 g/mol, preferably from 60,000 to 220,000 g/mol, said weight average molecular weight being determined as the polyethylene-equivalent molecular weight by high temperature size exclusion chromatography performed at 150° C. in o-dichlorobenzene using polyethylene as standard.

Method of Manufacture: Block Copolymer

In an embodiment the block copolymers can be manufactured for example by a three-step method.

In a first step (A) an olefinic monomer, especially ethylene or propylene, and optionally another olefinic comonomer is/are polymerised using a catalyst system to obtain a first polyolefin block containing a main group metal on at least one chain end; the catalyst system comprising:

i) a metal catalyst or metal catalyst precursor comprising a metal from Group 3-10 of the IUPAC Periodic Table of elements; and
ii) at least one type of chain transfer agent; and
iii) optionally a co-catalyst;

Thus, in step (A) a polyolefin, with or without comonomer, can be prepared by means of coordinative chain transfer polymerisation (CCTP) in the presence of a catalyst, cocatalyst, at least one type of chain transfer agent and optionally an additional chain shuttling agent. Chain transfer and/or chain shuttling agents used are typically for example aluminium-, boron- and/or zinc hydrocarbyl species. This process results in polyolefin chains that are end-functionalized with a metal atom, which is susceptible to react with an oxidizing agent such as oxygen.

In a second step (B) the first polyolefin block containing a main group metal on at least one chain end obtained in step A) may be reacted with at least one type of oxidizing agent and/or subsequently at least one type of metal substituting agent to obtain a first polyolefin block containing at least one functionalised chain end. Preferably the functionalised chain end comprises a hydroxyl group or a carboxylic acid group.

Thus, during step (B), the product obtained from step (A) may be treated for example with oxygen, as oxidizing agent, optionally followed by a protic agent, such as acidified alcohol as a metal substituting agent, to remove the metal affording a hydroxyl end-functionalized polyolefin product.

In a third step (C) at least one second polymer block is formed on the first polyolefin block, wherein as an initiator the functionalized chain end of the first polyolefin block obtained in step (B) may be used to obtain the block copolymer. Thus, in step (C) the product of step (B) may be used as a macro-initiator for the formation of the diblock copolymer.

Alternatively, the third step (C) mentioned above can also be performed with preformed or otherwise obtained polyolefins preferably for example with a functionalized chain end, that can be used as a macro-initiator to obtain the second polymer block. In such a case, the first and/or second steps (A and/or B) maybe optional.

The third step (C) can be performed for example by transesterification of a preformed transesterifiable polymer, especially for example a preformed polyester and/or ROP of lactones, also including for example dilactones and/or oligolactones.

A transesterifiable polymer in the sense of the invention may thereby be for example a polyester, a polycarbonate, a polyamide, a polyurethane, a polyurea, a random or block poly(carbonate-ester), poly(carbonate-ether), poly(ester-ether), poly(carbonate-ether-ester), poly(ester-amide), poly(ester-ether-amide), poly(carbonate-amide), poly(carbonate-ether-amide), poly(ester-urethane), poly(ester-ether-urethane), poly(carbonate-urethane), poly(carbonate-ether-urethane), poly(ester-urea), poly(ester-ether-urea), poly(carbonate-urea), poly(carbonate-ether-urea), poly(ether-amide), poly(amide-urethane), poly(amide-urea), poly(urethane-urea) or one or more combination(s) thereof.

During step (C), ROP of lactones and/or transesterification for example with a preformed transesterifiable polymer, especially for example a preformed polyester and/or a preformed polycarbonate is carried out in the presence of the hydroxyl chain-end functionalized polyolefin product during step (B) and a ROP and/or transesterification catalyst. Step (C) can be carried out for example in hydrocarbon solvent, especially an aromatic hydrocarbon solvent, or in the melt.

The steps A to C described above can thereby also be performed in a cascade-like process for example either in the same or in subsequent/connected reactors or vessels, preferably without additional intermediary and/or workup and/or drying and/or purification steps, even more preferred continuously. In a cascade-like process, the polymer preparation can also be carried out for example without a metal-substitution step, especially without a hydrolysis step. It should be noted that an extruder can also be considered as a reactor in the context of the present invention.

Method of Manufacture: Graft Copolymer

The graft copolymer, i.e. the copolymer wherein polyester blocks are grafted on or from a polyolefin backbone, can be manufactured for example by a three-step method.

In a first step (D) at least one first type of olefin monomer, especially for example ethylene or propylene, and at least one second type of metal-pacified functionalized olefin monomer are copolymerised using a catalyst system to obtain a polyolefin main chain having one or multiple metal-pacified functionalized short chain branches, the catalyst system comprising:

i) a metal catalyst or metal catalyst precursor comprising a metal from Group 3-10 of the IUPAC Periodic Table of elements;
ii) optionally a co-catalyst and/or scavenger;
iii) optionally a chain transfer agent Thus in step (D) an olefinic monomer, especially for example ethylene and/or propylene, is being copolymerized using for example a pacified hydroxyl or acid functionalized olefin comonomer in the presence of a catalyst and a cocatalyst, similarly as any other catalytic olefin copolymerisation, with the difference that the hydroxyl-functionalized or acid-functionalized olefinic comonomer is pacified by reacting it with a metal hydrocarbyl, especially for example an aluminium alkyl such as for example TiBA, prior and/or during to the copolymerisation.

In a second optional step (E) the polyolefin main chain having one or multiple metal-pacified functionalized short chain branches obtained in step (D) is reacted with at least one metal substituting agent to obtain a polyolefin main chain having one or multiple functionalized short chain branches; Preferably the functionalized chain end comprises a hydroxyl group or a carboxylic acid group.

Thus, during step (E), the protective group may be removed by treating the product of step (D) with a protic agent such as acidified alcohol, as metal substituting agent. The product of step (E) is a random copolymer of an olefin, especially for example propylene and/or ethylene, and an hydroxyl-functionalized or acid-functionalized olefin, where the hydroxyl or acid functionalities may be located on the short chain branches, especially for example at their ends.

In step (F) one or more polymer grafts are formed on the polyolefin main chain, wherein as initiators the functionalized short chain branches on the polyolefin main chain obtained in step (E) can be used to obtain the graft copolymer. Step (F) can be performed for example by transesterification of a preformed transesterifiable polymer, especially for example a preformed polyester and/or a preformed polycarbonate and/or by ROP of lactones, also including for example dilactones and/or oligolactones, and/or cyclic carbonates and/or a combination of epoxides and anhydrides and/or $CO_2$.

Thus, the product of step (E) can for example be subsequently used in step (F) as a macro-initiator for the formation of graft copolymer.

Alternatively, the third step (F) mentioned above can also be performed with preformed or otherwise obtained polyolefins with at least one, preferably at least two or more pending functionalities, that can be used as a macro-initiator to obtain the second polymer block. In such a case, the first and/or second steps (D and/or E) maybe optional.

During step (F), ROP of lactones or transesterification for example with a preformed transesterifiable polymer, especially for example a preformed polyester and/or a preformed polycarbonate is carried out in the presence of the random copolymer of an olefin, especially for example ethylene and/or propylene, and hydroxyl-functionalized olefins obtained in step (E) and a ROP and/or transesterification catalyst. Step (F) can be carried out in a hydrocarbon solvent, especially an aromatic hydrocarbon solvent, or in the melt.

The steps D to F described above can be performed in cascade-like process for example either in the same or in subsequent/connected reactors or vessels, preferably without additional intermediary and/or workup and/or drying and/or purification steps, even more preferred continuously. In a cascade-like process, the polymer preparation can be carried out preferably without a metal-substitution step, especially for example by hydrolysis. It should be noted that an extruder can also be considered as a reactor in the context of the present invention.

Polyolefin

A polyolefin in the composition according to the present invention can preferably be for example polypropylene and/or polyethylene.

Polypropylene in the composition may be for example:
one or more of a propylene homopolymer,
one or more of a propylene-α-olefin random copolymer, preferably a propylene ethylene or a propylene $C_4$-$C_8$ α-olefin random copolymer,
one or more of a propylene-α-olefin block copolymer,
one or more of a hetero-phasic polypropylene copolymer comprising a matrix phase and a dispersed phase, the matrix phase consisting of a propylene homopolymer and/or a propylene copolymer with up to 3 wt. % of ethylene and/or at least one $C_4$-$C_8$ α-olefin, the wt. % being based on the matrix phase, and the dispersed phase consisting of an ethylene-$C_3$-$C_8$ α-olefin copolymer,
a mixture of two or more of the foregoing polypropylenes.
Isotactic polypropylene may thereby be preferred.

If the polypropylene is a hetero-phasic copolymer it is preferred that the matrix phase is a propylene homopolymer and/or a propylene-ethylene copolymer with up to 3 wt. % of ethylene and further that the dispersed phase is an ethylene propylene copolymer with from 20-80 wt. % of propylene and 80-20 wt. % of ethylene, the wt. % based on the dispersed phase.

The polypropylene may preferably be a propylene homopolymer or a random copolymer of propylene with ethylene or with $C_4$-$C_8$ α-olefin. The random copolymer thereby contain for example at most 5 wt. %, on the basis of the copolymer, of said ethylene or α-olefin. The random copolymer may preferably be a propylene-ethylene random copolymer.

Preferably the melt flow rate of the polypropylene is from 0.1-100 g/10 min as measured in accordance with ISO 1133 (2.16 kg, 230° C.). More preferably the melt flow rate is from 5.0 to 60 g/10 min.

Polyethylene in the composition according to the present invention may be a very low density polyethylene (VLDPE), linear low density polyethylene (LLDPE), low density polyethylene (LDPE), medium density polyethylene (MDPE), high density polyethylene (HDPE). The polyethylene may also be a mixture of at least two or more of the foregoing polyethylenes. For example the polyethylene may be a mixture of LLDPE and LDPE or it may be a mixture of two different types of LDPE.

The terms VLDPE, LDPE, LLDPE, MDPE and HDPE are known in the art. Nevertheless, very low density polyethylene may mean polyethylene with a density of less than 915 $kg/m^3$. Linear low density polyethylene and low density polyethylene may mean polyethylene with a density of from 915 to 925 $kg/m^3$. Medium density polyethylene may mean polyethylene with a density of more than 925 $kg/m^3$ and less than 935 $kg/m^3$. High density polyethylene may mean polyethylene with a density of 935 $kg/m^3$ or more.

Preferably the melt flow rate of the may be for example polyethylene is from 0.1-100 g/10 min as measured in accordance with ISO 1133 (2.16 kg, 190° C.).

Polycarbonate

Polycarbonate in the composition according to the present invention may be a linear polymer obtained by polycondensation of a carbonate or other carbonylic reagent such as phosgene or triphosgene with a diol, especially for example a bisphenol.

Polycarbonate according to the present invention may also comprise ester functionalities and/or (silyl) ether functionalities and/or unsaturations.

Polycarbonate can especially for example be obtained by polycondensation of bisphenol A with a carbonate or phosgene. Accordingly obtained polycarbonate may comprise aromatic structures from the phenol. Polycarbonate comprising aromatic structure may thereby be called aromatic polycarbonate.

On the other hand, a polycarbonate may also not comprise aromatic structures. In such cases, polycarbonate may be called an aliphatic polycarbonate. Moreover, polycarbonate may also be semi-aromatic, which may mean it comprises both aliphatic and aromatic structures that may be originating from different diols.

Composition

The amounts of polyolefin in the composition may vary within wide limits. The amount of polyolefin may vary from 5-95 wt. % on the basis of the total amount of the composition. Preferably the amount of polyolefin is from 10-90 wt. %, 20-80 wt. %, 30-70 wt. % or 40-60 wt. % on the basis of the total amount of the composition. Accordingly the amount of polycarbonate may vary from 95-5 wt. % on the basis of the total amount of the composition. Preferably the amount of polyethylene is from 90-10 wt. %, 80-20 wt. %, 70-30 wt. % or 60-40 wt. % on the basis of the total amount of the composition.

The component of the composition present in the highest amount based on the total amount of the composition or forming the continuous phase may be considered as forming the matrix of the composition. Components of the composition present in lower amounts with respect to the matrix or belonging to a discontinuous phase may be considered as dispersed in the matrix and/or dispersed phase in the matrix.

The viscosity of the polyolefin and polycarbonate may preferably be selected for example so as to improve compatibilisation, for example between 1 and 10, preferably between 1.5 to 7, preferably from 2 to 5.5, even more preferred from 2.5 to 4.

In an embodiment, the compatibiliser according to the present invention may be premixed with dispersed phase, so as to possibly improve compatibilisation.

In an embodiment, the composition according to the invention may be obtained by premixing the compatibiliser with the matrix and/or the dispersed phase(s) of the composition before adding the other component of the composition.

A method of manufacture of the composition may comprise for example the steps of Preparing a master batch by melt mixing the polymer that will form the matrix in the composition and the compatibiliser, Melt mixing the master batch so obtained with the polymer that will form the dispersed phase in the composition.

or

Preparing a master batch by melt mixing the polymer that will form the dispersed phase in the composition and the compatibiliser, Melt mixing the master batch so obtained with the polymer that will form the matrix phase in the composition.

Preferably, a major part, even more preferred substantially all, of the compatibiliser may be contained in a master batch and that a minor part, preferably substantially none, of compatibiliser is added during the final melt mixing step that leads to the formation of the composition.

During the step of preparing a master batch for example from 80-100% of the total amount of compatibiliser may be added to the master batch and 0-20% of the total amount of compatibiliser maybe added during the step of preparing the composition from a master batch and the polymer that will form the matrix or the dispersed phase in the composition.

This method can contribute to the fact that the compatibiliser may be even more effective possibly resulting in even further optimized properties of the composition.

The amount of compatibiliser may be for example from 0.1-10 wt. %, preferably from 0.5-10 wt. %, especially from 2-10 wt. %, from 3-8 wt. % or from 4-7 wt. % on the basis of the total amount of the composition.

The composition may be obtained be mixing the component of the composition for example for at least 1 minute, at least 2 minutes, at least 3 minutes, at least 4 minutes, at least 5 minutes, at least 6 minutes, at least 8 minutes, at least 10 minutes, at least 15 minutes, at least 20 minutes.

In an embodiment the invention relates to a composition comprising 50-90 wt. % of polyolefin based on the total amount of the composition, 5-49 wt. % polycarbonate based on the total amount of the composition, 2-10 wt. % compatibiliser based on the total amount of the composition, wherein the polyolefin has a melt flow rate of from 1-20 (ISO 1133, 2.16 kg, 230° C.) and the compatibiliser has a M/F ratio ≥2 and ≤10 and having a weight average molecular weight of from 10000-250000 g/mol.

In an embodiment the invention relates to a composition comprising 50-90 wt. % of polycarbonate based on the total amount of the composition, 5-49 wt. % polyolefin based on the total amount of the composition, 2-10 wt. % compatibiliser based on the total amount of the composition, wherein the polyolefin has a melt flow rate of from 1-20 (ISO 1133, 2.16 kg, 230° C.) and the compatibiliser has a M/F ratio ≥2 and ≤10 and having a weight average molecular weight of from 1,000-250,000 g/mol, preferably 10,000-250,000 g/mol.

The composition may further contain additives common in the art such as for example dyes, pigments, antioxidants, ultra-violet stabilisers, infrared absorbers, flame retardants, mould release agents and the like. Such additives may be comprised for example in an amount of up to about 5 wt. % on the basis of the weight of the composition.

The composition may also further comprise reinforcing agents like for example talc, glass fibres, glass flakes, glass platelets, organic fibres, carbon fibres, cellulosic fibres and the like. Talc and or glass fibres being preferred. The amount of reinforcing agent may for example be from 1-20 wt. % on the basis of the weight of the composition.

A skilled person will understand that the composition according to the invention may preferably be a thermoplastic composition.

Articles

The present invention further relates to articles comprising the composition as disclosed herein. The present invention further relates to articles manufactured from the composition as disclosed herein. Generally the composition is converted into an article using a moulding technique such as injection moulding, extrusion moulding, blow moulding and compression moulding. Accordingly the present invention also relates to an article obtained by moulding the composition according to the present invention. It is also possible to manufacture profiles or tubes by means of profile or tube extrusion.

In the article obtained by moulding or extrusion at least part of the polyester block(s) of the compatibiliser is present in and/or entangled with in the polycarbonate phase and/or at least part of the polyolefin block(s) of the compatibiliser is present in and/or entangled the polyolefin phase.

Articles may be automotive interior articles, automotive exterior articles, household appliances, pipes, films, sheets, containers, water containers, infuse bags.

Use

In another aspect the present invention relates to the use of a block copolymer or graft copolymer comprising a polyolefin part and a polyester part, especially a polyolefin block or a polyolefin backbone and a polyester block or polyester grafts, whereby the polyester may be a non-aromatic polyester and/or may have an M/F ratio ≥2 and ≤25, preferably ≥2 and ≤10, wherein M is the number of backbone carbon atoms in the polyester not including the carbonyl carbons and F is the number of carboxylic acid or carbonylic acid ester groups as a compatibiliser in a blend of polyolefin and polycarbonate. The details and preferred embodiments as set out here before for the composition likewise apply to the use according to the invention.

The invention will now be further explained on the basis of the following non-limiting examples.

EXAMPLES

Materials

ε-caprolactone (CL) (97%, Sigma-Aldrich) and ethylene brassylate (>95%, Sigma-Aldrich) were dried over $CaH_2$ and distilled under reduced pressure. Toluene (Sigma-Aldrich) was dried using an MBraun-SPS-800 purification column system.

Measurement Methods

Conversion of reactions was determined by NMR:

$^1$H NMR analysis ($^1$H-NMR) carried out at 80-110° C. using deuterated tetrachloroethene (TCE-$d_2$) as the solvent and recorded in 5 mm tubes on a Varian Mercury spectrometer operating at frequencies of 400 MHz. Chemical shifts in ppm versus tetramethylsilane were determined by reference to the residual solvent.

$M_n$, $M_w$ and the polydispersity index (PDI, $Ð_M$) were determined as follows by size exclusion chromatography:

For Copolymers Comprising Polyethylene:

Size exclusion chromatography (SEC) was performed at 160° C. on a Polymer Laboratories PLXT-20 Rapid GPC Polymer Analysis System (refractive index detector and viscosity detector) with 3 PLgel Olexis (300×7.5 mm, Polymer Laboratories) columns in series. 1,2,4-trichlorobenzene (TCB) was used as eluent at a flow rate of 1 mL·min$^{-1}$. The molecular weights were calculated with respect to polyethylene standards (Polymer Laboratories). A Polymer Laboratories PL XT-220 robotic sample handling system was used as autosampler. The SEC-data were processed using Cirrus software from Agilent.

For Copolymers Comprising Polypropylene:

SEC measurements were performed at 150° C. on a Polymer Char GPC-IR® built around an Agilent GC oven model 7890, equipped with an autosampler and the Integrated Detector IR4. 1,2-dichlorobenzene (oDCB) was used as an eluent at a flow rate of 1 mL/min. The SEC-data were processed using Calculations Software GPC One®.

Melting ($T_m$) and crystallization ($T_c$) temperatures as well as enthalpies of the transitions were measured by differential scanning calorimetry (DSC) using a DSC Q100 from TA Instruments. The measurements were carried out at a heating and cooling rate of 10° C.·min$^{-1}$ from −60° C. to 210° C. The transitions were deduced from the second heating and cooling curves.

Typical Procedure for the Synthesis of Hydroxyl End-Capped Polyethylene:

Polymerisation reactions were carried out in stainless steel Büchi reactors (300 mL). Prior to the polymerisation, the reactor was dried in vacuo at 40° C. and flushed with dinitrogen. PMH (90 mL) and MAO solution were added and stirred at 50 rpm for 20-30 min. TIBA and/or DEZ were added, the solution was saturated with ethylene and stirred for 10 min. In a glove box, the catalyst was dissolved in toluene (c.a. 3 mL) and transferred into the reactor. The reactor was then pressurized to the desired pressure with ethylene and the pressure was maintained for a predefined time. At the end of polymerisation, the ethylene feed was stopped and after releasing the residual ethylene pressure, synthetic air was injected through a gas injection tube and the suspension was maintained under constant oxygen pressure (6 bars) at 60° C. for 2 h with rigorous stirring (600 rpm) before quenching with 300 mL of acidified methanol (10% concentrated HCl) to isolate the functionalized polyethylene. The resulting white powder was then filtered, washed with methanol and dried at 60° C. in vacuo overnight.

Synthesis of Aluminum-Salen Complex 1:

N,N'-bis(salicylidene)ethylenediamine (2.0 g, 7.5 mmol) was suspended in toluene (30 mL) under $N_2$ flow. Subsequently, $Al(CH_3)_3$ (2M solution in toluene, 3.75 mL, 7.5 mmol) was added via syringe and the mixture was stirred at room temperature. The thus obtained solution was concentrated to half the original volume and pale yellow needles of Al-salen complex 1 were isolated with a yield of 93%.

Synthesis of Aluminum-Salen Complex 2:

N,N'-bis(salicylidene)-2,2-dimethyl-1,3-propanediamine (2.0 g, 5.7 mmol) was suspended in toluene (30 mL) under $N_2$ flow. Subsequently, $Al(CH_3)_3$ (2 M solution in toluene, 2.85 mL, 5.7 mmol) was added via syringe and the mixture was stirred at room temperature. The thus obtained solution was concentrated to half the original volume and pale yellow needles of Al-salen complex 2 were isolated with a yield of 90%.

FIG. 1 shows:

1: Al-salen complex 1, 2: Al-salen complex 2 and 3: 1,5,7-triazabicyclo[4.4.0]dec-5-ene (TBD).

Typical Procedure for Synthesis of PE-Block-PCL Copolymers Via ROP:

A glass crimp cap vial was charged with toluene (1.5 mL), ε-caprolactone (CL, 4.5 mmol), hydroxyl end-capped PE (13 mg, 8.7 µmol) and Al-salen complex 1 or 2 (8.7 µmol). All manipulations were carried out in the glovebox. Then, the mixture was removed from the glovebox and stirred in an oil bath at 100° C. The progress of the reaction was followed by $^1$H NMR spectroscopy by taking aliquots at set time intervals. The synthesized copolymer was cooled to room temperature and quenched using acidified methanol, isolated and dried in vacuum at room temperature for 18 h. Results are shown in Table 1 below. The average M/F ratio for PCL may thereby be 5.

Typical Procedure for the Synthesis of LLDPE Comprising an LLDPE Main Chain with Randomly Distributed Hydroxyl-Functionalized Short Chain Branches:

Copolymerisation reactions of ethylene/10-undecen-1-ol were carried out in stainless steel Büchi reactors (300 mL). Prior to the polymerisation, the reactor was dried in vacuo at 40° C. and flushed with dinitrogen. Pentamethylheptane (PMH) solvent (90 mL) was introduced followed by TIBA and the functional monomer under an inert atmosphere. The resulting solution was stirred for 15-20 min followed by the addition of calculated amount of cocatalyst under dinitrogen atmosphere. The solution was saturated with ethylene and stirred for 10 min. The polymerisation reaction was started by the addition of the catalyst to the reactor. The reactor was then pressurized to the desired pressure with ethylene and the pressure was maintained for a predefined time. The ethylene feed was stopped and the resulting mixture was quenched in acidified methanol, filtered and dried under reduced pressure at 60° C. for 24 h.

TABLE 1

Ring-opening polymerisation of CL affording block copolymers.

| entry | CL/cat/in | time [h] | T [° C.] | $M_n^a$ [kg/mol] | $Ð_M^a$ | CL conv.$^b$ |
|---|---|---|---|---|---|---|
| Catalyst: Al-salen complex 1 | | | | | | |
| 1 | 1000/1/1 | 5 | 100 | 22520 | 1.8 | 97 |
| 2 | 1000/1/1* | 5 | 100 | 15450 | 1.7 | 98 |
| Catalyst: Al-salen complex 2 | | | | | | |
| 3 | 1000/1/1 | 5 | 100 | 30110 | 1.6 | 99 |
| 4 | 1000/1/1 | 0.5 | 100 | 9940 | 1.9 | 95 |
| 5 | 1000/1/1 | 1 | 100 | 18380 | 1.7 | 97 |
| 6 | 1000/1/1* | 0.5 | 100 | 46700 | 1.7 | 95 |
| 7 | 1000/1/1* | 1 | 100 | 51000 | 1.6 | 95 |
| 8 | 1000/1/1 | 0.5 | 80 | 2450 | 1.8 | 95 |
| 9 | 1000/1/1 | 1 | 80 | 19200 | 1.7 | 97 |

Conditions of ROP: polymerisations mediated by catalyst 1, catalyst 2 and hydroxyl functionalized linear PE with $M_n$ = 2230, $Ð_M$ = 2.1
$^a$molecular weight and polydispersity determined by HT-SEC in TCB at 160° C.;
$^b$conversion of the lactones was estimated based on $^1$HNMR analysis.
*before the monomer was added the Al-salen complexes 1 or 2 were activated with the initiator in toluene for 12 h at 100° C.

Typical Procedure for Synthesis of LLDPE-Graft-PCL Copolymers Via ROP:

A glass crimp cap vial was charged with ε-caprolactone (4.8 mmol) and Al-salen complex 2 (1.68 mg, 5 μmol), LLDPE comprising a LLDPE main chain with randomly distributed hydroxyl-functionalized short chain branches (44.1 mg, 5 μmol) and toluene (1.50 g, 16.3 mmol). All manipulations were carried out in the glovebox. Then, the mixture was removed from the glovebox and stirred in an oil bath at 100° C. The progress of the reaction was followed by $^1$H NMR spectroscopy by taking aliquots at set time intervals. The synthesized copolymer was cooled to room temperature and quenched using acidified methanol, isolated and dried in vacuum at room temperature for 18 h. Results are shown in Table 2 below. The average M/F ratio for PCL may thereby be 5.

Typical Procedure for Randomly Hydroxyl-Functionalized HDPE:

A mixture of cis-cyclooctene (5 g, 45.5 mmol) and 5-hydroxy-cis-cyclooctene (172 mg, 1.36 mmol), $2^{nd}$ generation Grubbs catalyst (19.3 mg, 22.7 μmol) and toluene (10.0 mL) were stirred at room temperature for 24 h. The manipulations were carried out in the glovebox. Ethyl vinyl ether (1.7 mg, 22.7 μmol) was added to quench the polymerisation after which the polymer was precipitated in acidified methanol. The unsaturated polymers were redissolved in toluene and transferred to a 300 mL stainless steel Büchi reactor. Subsequently, an appropriate amount of Wilkinson's catalyst dissolved in a small amount of toluene (2 mL) was added via syringe and the mixture was stirred for 48 h at 90° C. under the $H_2$ (20 bar). Afterwards, the reaction mixture was quenched in acidified methanol, filtered and purified by re-precipitation in methanol. The saturated polymer, obtained with the yield of 94%, was dried under reduced pressure at 80° C. for 24 h.

Typical Procedure for Synthesis of HDPE-Graft-PCL Copolymers Via ROP:

A glass crimp cap vial was charged with ε-CL (4.8 mmol) and Al-salen catalyst 1 (3 mg, 9.7 μmol), randomly hydroxyl-functionalized HDPE (70 mg, 9.7 μmol) and toluene (1.50 g, 16.3 mmol). All manipulations were carried out in the glovebox. Then, the mixture was removed from the glovebox and stirred in an oil bath at 100° C. The progress of the reaction was followed by $^1$H NMR spectroscopy by taking aliquots at set time intervals. The synthesized copolymer was cooled to room temperature and quenched using acidified methanol, isolated and dried in vacuum at room temperature for 18 h. Results are shown in Table 2 below. The average M/F ratio for PCL may thereby be 5.

TABLE 2

Ring-opening polymerisation of CL affording HDPE-graft-PCL and LLDPE-graft-PCL copolymers.

| entry | CL/cat/in | time [h] | T [° C.] | $M_n^c$ [kg/mol] | $Đ_M^c$ | CL conv.$^d$ |
|---|---|---|---|---|---|---|
| Catalyst: Al-salen complex 2 | | | | | | |
| $1^a$ | 1000/1/1 | 2 | 100 | 24800 | 2.1 | 97 |
| $2^a$ | 500/1/1 | 2 | 100 | 85900 | 2.3 | 94 |
| $3^a$ | 250/1/1 | 2 | 100 | 20700 | 2.8 | 90 |
| $4^b$ | 1000/1/1 | 2 | 100 | 17070 | 2.5 | 94 |
| $5^b$ | 500/1/1 | 2 | 100 | 15400 | 2.7 | 95 |
| $6^b$ | 250/1/1 | 2 | 100 | 12070 | 2.5 | 99 |
| Catalyst 3: 1,5,7-triazabicyclo[4.4.0]dec-5-ene (TBD) | | | | | | |
| $7^a$ | 500/1/1 | 24 | 100 | 46600 | 2.1 | 84 |
| $8^a$ | 200/1/1 | 24 | 100 | 21900 | 2.2 | 96 |
| $15^a$ | 100/1/1 | 24 | 100 | 15500 | 2.3 | 96 |

$^a$Conditions of ROP: polymerisations mediated by Al-salen complex 2 or TBD and randomly hydroxyl-functionalized HDPE with $M_n$ = 9500 $Đ_M$ = 2.4 $M_n$ = 9500 $Đ_M$ = 2.4.
$^b$polymerisations mediated by Al-salen complex 2 and LLDPE comprising a LLDPE main chain with randomly distributed hydroxyl-functionalized short chain branches with $M_n$ = 9200 $Đ_M$ = 2.1
$^c$Molecular weight and polydispersity determined by HT-SEC in TCB at 160° C.;
$^d$Conversion of the lactones was estimated based on $^1$HNMR analysis.

Typical Procedure for Synthesis of PE-Graft-PCL Copolymers Via Reactive Extrusion:

The preparation was carried out in a micro compounder MC15 ml from Xplore equipped with co-rotating screws, a barrel with three 3 temperature zones and a nitrogen purge at 150° C. (three temperature zones set to 150° C.) with a screw RPM setting at 100. To form N-(2-hydroxyethyl) succinimide attached to the PE backbone maleic anhydride (MAH) functionalized HDPE (Yparex OH07, 10 g, functionalized with 1.5 wt. % of MAH, MRI=18 g/10 min, $M_n$=12.6 kg/mol, $M_w$=40.2 kg/mol, Đ=3.2) with Irganox 1010 (supplied by BASF, tetrakis [Methylene-3 (3',5'-di-tert-butyl-4-hydroxyphenyl)propionate]methane, 2250 ppm) was feed into the extruder and after a few minutes ethanolamine (0.28 g, 4.6 mmol) was added via syringe. The mixture was processed and then the extruder chamber was evacuated. The so obtained hydroxyl functionalized polyethylene was purified by dissolution in m-xylene at 120° C. and precipitated in a cold acetone. The copolymer was dried in a vacuum oven for 48 h at room temperature. Subsequently hydroxyl-functionalized PE (8.0 g, $M_n$=12.6 kg/mol Đ=3.2) and PCL (2.0 g, $M_n$=25.6 kg/mol, Đ=1.3) were feed into a twin-screw micro compounder MC15 ml from Xplore equipped with co-rotating screws, a barrel with three 3 temperature zones and a nitrogen purge at 150° C., 160° C., 180° C., respectively a screw RPM setting at 100. The polymers were premixed for 5 minutes. Then the catalyst $Sn(Oct)_2$ (0.19 g, 0.5 mmol) was added and the mixture was stirred in the extruder for 2 minutes. After this time the extruder was evacuated. The copolymer was purified by dissolution in m-xylene at 120° C. and precipitation in a cold acetone. The copolymer was dried in a vacuum oven for 48 h at room temperature. The average M/F ratio for PCL may thereby be 5.

Typical Procedure for Synthesis of PP-Graft-PCL or PP-Graft-PEB Copolymers in Solution or Via Reactive Extrusion:

The preparation was carried out in solution or in a twin-screw micro compounder MC15 ml from Xplore. The micro compounder was equipped with co-rotating screws, a barrel with three 3 temperature zones and a nitrogen purge at 160° C., 180° C., 190° C., respectively with a screw RPM setting at 100. To form N-(2-hydroxyethyl) succinimide attached to the PP backbone maleic anhydride (MAH) functionalized PP (polypropylene homopolymer functionalized with between 0.5 and 1 wt. % of MAH, commercially available under the name Exxelor PO1020) with Irganox average M/F ratio for PCL may thereby be 5 and the average M/F ratio for PEB may be 6.5.

TABLE 3

PP-graft-PCL or PP-graft-PEB copolymers prepared in Solution or via reactive extrusion.

| Entry | PP-MAH | | PP-OH | | | Polyesters | | | Copolymers | | Time | Catalyst [%] | Temp. [° C.] |
|---|---|---|---|---|---|---|---|---|---|---|---|---|---|
| | $M_n$ [kg · mol$^{-1}$] | $M_w$ [kg · mol$^{-1}$] | $M_n$ [kg · mol$^{-1}$] | $M_w$ [kg · mol$^{-1}$] | Amout [g] | $M_n$ [kg · mol$^{-1}$] | $M_w$ [kg · mol$^{-1}$] | Amout [g] | $M_n$ [kg · mol$^{-1}$] | $M_w$ [kg · mol$^{-1}$] | | | |
| PP-PCL/A | 22.0 | 97.7 | 17.1 | 50.2 | 8 | 12.4 | 26.0 | 4 | 46.7 | 116.8 | 20 h (reaction in solution) | 0.5% 0.06 g Sn(Oct)$_2$ | 120 |
| PP-PCL/B | 22.0 | 97.7 | 36.6 | 117.9 | 6 | 12.4 | 26.0 | 3 | 29.6 | 132.3 | premixed 5 min reaction 2 min | 0.5% 0.045 g Sn(Oct)$_2$ | 180 |
| PP-PCL/C | 22.0 | 97.7 | 34.5 | 103.9 | 8 | 12.4 | 26.0 | 4 | 32.7 | 111.9 | 6 h (reaction in solution) | 0.5% 0.06 g Sn(Oct)$_2$ | 120 |
| PP-PCL/D | 22.0 | 97.7 | 36.6 | 117.9 | 6 | 20.1 | 45.9 | 3 | 42.7 | 162.5 | premixed 5 min reaction 2 min | 0.5% 0.045 g Sn(Oct)$_2$ | 180 |
| PP-PCL/E | 22.0 | 97.7 | 36.6 | 117.9 | 6 | 20.1 | 45.9 | 3 | 34.2 | 166.3 | premixed 5 min reaction 5 min | 0.5% 0.045 g Sn(Oct)$_2$ | 180 |
| PP-PCL/F | 22.0 | 97.7 | 36.6 | 117.9 | 6 | 20.1 | 45.9 | 3 | 47.2 | 183.9 | premixed 5 min reaction 5 min | 1% 0.09 g Sn(Oct)$_2$ | 180 |
| PP-PEB/A | 22.0 | 97.7 | 28.8 | 104.6 | 6 | 9.7 | 24.5 | 3 | 22.5 | 122.0 | premixed 5 min reaction 5 min | 1% 0.09 g Sn(Oct)$_2$ | 180 |
| PP-PEB/B | 22.0 | 97.7 | 28.8 | 104.6 | 6 | 28.2 | 75.6 | 3 | 28.4 | 113.0 | premixed 5 min reaction 5 min | 1% 0.09 g Sn(Oct)$_2$ | 180 |
| PP-PEB/C | 9.6 | 36.6 | 15.4 | 46.1 | 6 | 28.2 | 75.6 | 3 | 23.1 | 110.4 | premixed 5 min reaction 5 min | 1% 0.09 g Sn(Oct)$_2$ | 180 |

1010 (supplied by BASF, tetrakis [Methylene-3 (3',5'-di-tert-butyl-4-hydroxyphenyl)propionate] methane, 2250 ppm) was feed into the extruder and after a few minutes ethanolamine (0.28 g, 4.6 mmol) was added via syringe. The mixture was processed and then the extruder chamber was evacuated. The so obtained hydroxyl functionalized polypropylene was purified by dissolution in m-xylene at 120° C. and precipitated in a cold acetone. The copolymer was dried in a vacuum oven for 48 h at room temperature. Subsequently hydroxyl-functionalized PP and PCL or PEB in amounts indicated in Table 3 below were added to 400 ml of m-xylene to form a solution or feed into extruder with the temperature of the barrel zones set at 180° C. (three temperature zones set at 180° C.), and a screw RPM setting at 100. The polymers were premixed for 5 minutes. Then the catalyst Sn(Oct)$_2$ was added in the amount indicated in Table 3 below and the mixture was stirred in the extruder for reaction times of 2 or 5 minutes as indicated in Table 3 below. After this time the extruder was evacuated. The copolymer was purified by dissolution in m-xylene at 120° C. and precipitation in a cold acetone. The copolymer was dried in a vacuum oven for 48 h at room temperature. The Typical Procedure for the Preparation of the PP/PC Blends:

Polypropylene and polycarbonate (PC) according to Table 4 were fed into the extruder chamber. The mixture was processed for 2 or 5 minutes as indicated in Table 4 in a twin-screw micro compounder MC15 ml from Xplore. The micro compounder was equipped with co-rotating screws, a barrel with three 3 temperature zones and a nitrogen purge at 240° C. (three temperature zones set at 240° C.) with a screw rotation rate of 100 rpm. Afterwards the mixture was evacuated directly to a mini-injection moulding machine to prepare samples for morphology analysis.

For each blend of the blends indicated in Table 4 10 gr samples were prepared with the indicated PP/PC ration and the amount of compatibiliser (comp.) indicated in each case (0.5 g) was added on top to each sample to get 10.5 g of each compatibilised blend.

Both for PP-graft-PCL and PP-graft-PEB used as compatibilisers for PP/PC blends SEM pictures and analysis of samples of the blends listed in Table 4 show improved compatibilisation compared to corresponding non-compatibilised blends, especially for example smaller and/or better dispersed domain of the dispersed phase and/or optionally an increased adhesion between the two different polymer phases.

TABLE 4

PP/PC blends prepared using PP-graft-PCL or PP-graft-PEB copolymers as compatibilisers.

| | MATERIALS FOR COMPATYIBILIZERS | | | | | | | | | | |
|---|---|---|---|---|---|---|---|---|---|---|---|
| | POLYPROPYLENE PP-graft-OH | | POLYESTERS | | COPOLYMERS | | BLENDS | | | | |
| | $M_n$ [kg·mol$^{-1}$] | $M_w$ [kg·mol$^{-1}$] | $M_n$ [kg·mol$^{-1}$] | $M_w$ [kg·mol$^{-1}$] | $M_n$ [kg·mol$^{-1}$] | $M_w$ [kg·mol$^{-1}$] | PP | PC | PP/PC | comp. [g] | time [min] |
| PP-PEB/B | 28.8 | 104.6 | 28.2 | 75.6 | 28.4 | 113.0 | PP500P | PC105 | 80/20 | 0.5 | 5 |
| PP-PEB/C | 15.4 | 46.1 | 28.2 | 75.6 | 23.1 | 110.4 | PP500P | PC105 | 80/20 | 0.5 | 5 |
| PP-PEB/B | 28.8 | 104.6 | 28.2 | 75.6 | 28.4 | 113.0 | PP531P | PC105 | 80/20 | 0.5 | 5 |
| PP-PEB/C | 15.4 | 46.1 | 28.2 | 75.6 | 23.1 | 110.4 | PP531P | PC105 | 80/20 | 0.5 | 5 |
| PP-PEB/B | 28.8 | 104.6 | 28.2 | 75.6 | 28.4 | 113.0 | PP531P | PC175 | 80/20 | 0.5 | 5 |
| PP-PEB/C | 15.4 | 46.1 | 28.2 | 75.6 | 23.1 | 110.4 | PP531P | PC175 | 80/20 | 0.5 | 5 |
| PP-PCL/A | 17.1 | 50.2 | 12.4 | 26.0 | 30.1 | 193.8 | PP500P | PC105 | 80/20 | 0.5 | 5 |
| PP-PCL/A | 17.1 | 50.2 | 12.4 | 26.0 | 30.1 | 193.8 | PP531P | PC105 | 80/20 | 0.5 | 5 |
| PP-PCL/A | 17.1 | 50.2 | 12.4 | 26.0 | 30.1 | 193.8 | PP531P | PC105 | 80/20 | 0.5 | 2 |

SEM analysis of the freeze fractured samples were performed using HITACHI SU8010 apparatus equipped with cold cathode field-emission source. The samples were sputter coated using Cressington Sputter Coater 108Auto with Au.

Based on the SEM pictures and analysis, one can also see that the compatibilisers according to the invention with higher M/F values higher than found for PCL, especially for example PEB based polymer compatibilisers according to the invention may thereby also display further improved adhesion between the two different compatibilised phases, even when compared to compatibilisers according to the invention with lower M/F values, especially for example PCL based polymer compatibilisers according to the invention.

Typical Procedure for Synthesis of PE-Graft-PCL Copolymers Via Transesterification:

The experiments were carried out in a twin-screw mini-extruder MC15 ml from Xplore at 150° C. with a screw RPM setting at 100. To form N-(2-hydroxyethyl)succinimide attached to the PE backbone (hydroxyl functionalized PE), maleic anhydride functionalized HDPE (Yparex OH07, 10 g, Mn 12600, g/mol, Đ=3.2, MFR 18 g/10 min at 200° C./5 kg with 1.5 wt.-% maleic anhydride) with Irganox B225 (2500 ppm, from BASF, blend of Irganox 1010 and tris(2,4-ditert-butylphenyl) phosphite) was fed into the extruder and after a few minutes ethanolamine (0.28 g, 4.6 mmol) was added via syringe. The mixture was processed and then the extruder chamber was evacuated. The hydroxyl functionalized polyethylene was purified by dissolution in m-xylene at 120° C. and precipitated in a cold acetone. Subsequently, hydroxyl-functionalized PE (8.0 g, $M_n$=12.6 kg/mol, Đ=3.2) and PCL (2.0 g, $M_n$=25.6 kg/mol, Đ=1.3) were fed into a corotating twin screw mini extruder MC15 ml from Xplore at 150° C. with a screw RPM setting at 100. The polymers were premixed for 5 minutes. Then the catalyst Sn(Oct)$_2$ (0.19 g, 0.5 mmol) was added and the mixture was stirred in the extruder for 2 minutes. After this time the extruder was evacuated. The copolymer was purified by dissolution in m-xylene at 120° C. and precipitation in a cold acetone. The copolymer was dried in a vacuum oven for 48 h at room temperature. The average M/F ratio for PCL may thereby be 5.

Typical Procedure for Preparation of LDPE/PC Blends:

8.0 g of LDPE (LDPE2801, MFR=0.55 g/10 min at 190° C./2.16 kg) and 2.0 g, PC (PC115, MFR=15 g/10 min at 300° C./1.2 kg) were mixed in the mini-extruder chamber (MC15 ml from Xplore). The mixture was processed at 230° C. for 5 minutes with a screw rotation rate set at 100 rpm. The weight ratio of LDPE to PC was 80/20. The blends were investigated in terms of the morphology, mechanical properties and surface properties.

Typical Procedure for Preparation of LDPE/PC Blends Compatibilized by HDPE-Graft-PCL Copolymer:

8.0 g of LDPE (LDPE2801, MFR=0.55 g/10 min at 190° C./2.16 kg), 2 g of PC (PC115, MFR=15 g/10 min at 300° C./1.2 kg), and 0.5 g of HDPE-block-PCL were mixed in the mini-extruder chamber (MC15 ml from Xplore). The mixture was processed at 230° C. for 5 minutes with a screw rotation rate set at 100 rpm at a weight ratio of LDPE/PC/comaptibilizer 80/20/5, respectively. The blends were investigated in terms of the morphology, mechanical properties and surface properties.

Typical Procedure for Preparation of HDPE/PC Blends:

8.0 g of HDPE (HDPE CC253, MFR=1.8 g/10 min at 190° C./2.16 kg) and 2.0 g, PC (PC115, MFR=15 g/10 min at 300° C./1.2 kg) were mixed in the mini-extruder chamber (MC15 ml from Xplore). The mixture was processed at 230° C. for 5 minutes with a screw rotation rate set at 100 rpm. The weight ratio of HDPE to PC was 80/20. The blends were investigated in terms of the morphology, mechanical properties and surface properties.

Typical Procedure for Preparation of HDPE/PC Blends Compatibilized by HDPE-Graft-PCL Copolymer:

8.0 g of HDPE (HDPE CC253, MFR=1.8 g/10 min at 190° C./2.16 kg), 2 g of PC (PC115, MFR=15 g/10 min at 300° C./1.2 kg), and 0.5 g of HDPE-block-PCL were mixed in the mini-extruder chamber (MC15 ml from Xplore). The mixture was processed at 230° C. for 5 minutes with a screw rotation rate set at 100 rpm at a weight ratio of HDPE/PC/comaptibilizer 80/20/5, respectively. The blends were investigated in terms of the morphology, mechanical properties and surface properties.

TABLE 5

PE/PC blends prepared using HDPE-graft-PCL copolymers prepared by ROP and transesterification as compatibilisers.

| Entry | PE/PC weight ratio | compatibilizer | $\sigma_{max}^{c}$ [MPa] | $\varepsilon_{at\ break}^{d}$ [%] | Izod impact strength [kJ/m$^2$] | $\Theta^{e}$ [°] |
|---|---|---|---|---|---|---|
| LDPE2501 | 100/0 | — | 19.49 ± 1.53 | 40.9 ± 18.4 | 31.9 ± 0.4 | — |
| LDPE2501/PC115 | 80/20 | — | 25.53 ± 0.42 | 51.0 ± 4.5 | 51.0 ± 9.5 | — |
| LDPE2501/PC115 | 80/20 | HDPE-graft-PCL$^a$ | 25.71 ± 0.73 | 46.1 ± 2.1 | 60.0 ± 2.0 | — |
| LDPE2501/PC115 | 80/20 | HDPE-graft-PCL$^b$ | 25.40 ± 0.54 | 44.8 ± 3.3 | 70.6 ± 7.6 | — |
| LDPE2501/PC115 | 50/50 | — | 28.56 ± 0.79 | 25.6 ± 4.9 | 46.1 ± 2.6 | — |
| LDPE2501/PC115 | 50/50 | HDPE-graft-PCL$^a$ | 30.81 ± 0.34 | 21.7 ± 6.3 | 82.3 ± 12.0 | — |
| LDPE2501/PC115 | 20/80 | — | 34.90 ± 1.54 | 6.3 ± 0.4 | 107.9 ± 11.9 | — |
| LDPE2501/PC115 | 20/80 | HDPE-graft-PCL$^a$ | 49.92 ± 0.40 | 5.6 ± 0.3 | 103.6 ± 8.7 | — |
| LDPE2501/PC115 | 20/80 | HDPE-graft-PCL$^b$ | 41.01 ± 1.51 | 11.9 ± 1.5 | 127.1 ± 4.8 | — |
| LDPE2801 | 100/0 | — | 25.1 ± 1.3 | 55.9 ± 14.5 | 42.13 ± 0.03 | 92.6 ± 0.5 |
| LDPE2801/PC115 | 80/20 | — | 26.1 ± 2.6 | 38.6 ± 3.9 | 48.5 ± 19.3 | 93.8 ± 0.2 |
| LDPE2801/PC115 | 80/20 | HDPE-graft-PCL$^a$ | 27.3 ± 0.2 | 51.2 ± 3.4 | 55.9 ± 12.1 | 90.8 ± 1.3 |
| LDPE2801/PC115 | 80/20 | HDPE-graft-PCL$^b$ | 27.8 ± 0.2 | 51.8 ± 2.5 | 54.5 ± 19.9 | 87.6 ± 1.8 |
| LDPE2801/PC105 | 80/20 | — | 22.12 ± 0.26 | 31.6 ± 1.7 | 47.4 ± 6.2 | — |
| LDPE2801/PC105 | 80/20 | HDPE-graft-PCL$^a$ | 26.44 ± 0.60 | 27.5 ± 8.7 | 51.0 ± 0.8 | — |
| LDPE2801/PC105 | 80/20 | HDPE-graft-PCL$^b$ | 28.01 ± 1.02 | 32.6 ± 7.3 | 65.2 ± 3.7 | — |
| HDPE CC253 | 100/0 | — | 30.4 ± 0.8 | 172.1 ± 43.7 | 84.4 ± 4.4 | 97.2 ± 1.7 |
| HDPE CC253/PC115 | 80/20 | — | 38.7 ± 0.4 | 29.4 ± 1.4 | 80.4 ± 9.3 | 84.3 ± 0.2 |
| HDPE CC253/PC115 | 80/20 | HDPE-graft-PCL$^a$ | 33.5 ± 1.6 | 148.8 ± 8.4 | 71.1 ± 9.1 | 83.4 ± 0.1 |
| HDPE CC253/PC115 | 80/20 | HDPE-graft-PCL$^b$ | 32.1 ± 2.2 | 312.2 ± 27.5 | 81.6 ± 18.8 | 84.3 ± 0.6 |

$^a$copolymer prepared via transesterification reaction
$^b$copolymer prepared via ring opening polymerization
$^c$maximum stress
$^d$elongation at break
$^e$water contact angle Mechanical properties like maximum stress, elongation at break and Izod impact strength have been determined as follows.

Tensile tests were performed to determine maximum stress and elongation at break with a Zwick type Z020 tensile tester equipped with a 20 kN load cell. The tests were performed on injection molded samples having the dimensions of 75 mm×4 mm×2 mm. A grip-to-grip separation of 50 mm was used. The samples were pre-stressed to 3 N, then loaded with a constant cross-head speed 50 mm/min. The analysis was performed to determine $\sigma_{max}$ and $\varepsilon_{at\ break}$.

Izod impact strength was measured using a Zwick/Roell HIT5.5P tester according to ISO 180-2001. The dimensions of the injection molded sample bars without notch were 60 mm×10 mm×4 mm. For each sample the average value reported was derived for at least five specimens. The testing was carried out at room temperature (25° C.).

Surface properties were determined by water contact angle measurements. The water contact angles were measured by putting sessile drops of the liquid on the samples and monitoring the drop shape, using by contact angle goniometer DataPhysics OCA 20 Instrument at a temperature of 23° C. Sessile drops (1 µl) of a distilled water were used for the advancing contact angle measurements. The ellipse method was used for extraction of the drop profile.

SEM analysis of the freeze fractured samples were again performed to determine morphology using HITACHI SU8010 apparatus equipped with cold cathode field-emission source. The samples were sputter coated using Cressington Sputter Coater 108Auto with Au.

Based on the SEM pictures and analysis, one can see again that the compatibilisers according to the invention improve adhesion between the two different compatibilised phases.

TABLE 6

Materials used for the blends.

| Materials | $M_n$ [kg · mol$^{-1}$] | $M_w$ [kg · mol$^{-1}$] | PDI | MFR [g/10 min] | Density [g/cm$^3$] |
|---|---|---|---|---|---|
| PP500P | 61.6 | 410.3 | 6.7 | 3.1 (230° C./2.16 kg) | 0.905 |
| PP531P | 48.6 | 222.3 | 4.6 | 0.5 (230° C./2.16 kg) | 0.905 |
| PC105 | 11.9 | 29.9 | 2.5 | 7.0 (300° C./1.2 kg) | 1.19 |
| PC175 | 9.6 | 22.2 | 2.3 | 62.0 (300° C./1.2 kg) | 1.2 |
| PC115 | 8.1 | 18.2 | 2.2 | 15.0 (300° C./1.2 kg) | 1.2 |
| HDPE CC253 | 22.0 | 81.9 | 3.7 | 1.8 (190° C./2.16 kg) | 0.952 |
| LDPE2501 | 17.0 | 62.1 | 3.6 | 0.75 (190° C./2.16 kg) | 0.925 |
| LDPE2801 | 19.5 | 77.0 | 3.9 | 0.55 (190° C./2.16 kg) | 0.928 |

The above listed SABIC materials (Table 6) were used for the preparation of the blends listed in Table 4 and Table 5. SABIC PP500P and PP531P are thereby commercial polypropylene homopolymers. HDPE CC253, LDPE2501 and LDPE2801 from SABIC are respectively high and low density polyethylenes. On the other hand, LEXAN™ Resin 105 from SABIC (PC105 in the Table above) and WONDERLITE®-PC175 from Chi Mei Corporation (PC175 in the Table above) and WONDERLITE®-PC115 from Chi Mei Corporation (PC115 in the Table above) are polycarbonates than can be produced via the phosgene route.

The invention claimed is:

1. A composition comprising a polyolefin, polycarbonate and a compatibiliser, wherein said compatibiliser is a block copolymer comprising a polyolefin part and a polyester part, said polyester part having an average M/F ratio ≥2 and ≤25, wherein M is the number of backbone carbon atoms in the polyester not including the carbonyl carbons and F is the number of ester groups in the polyester,
   wherein the compatibiliser is a BAB type block copolymer with A representing polyolefin and B representing polyester.

2. The composition of claim 1, wherein the polyester part has an average M/F ratio ≥2 and ≤10.

3. The composition of claim 1, wherein the amount of polyolefin excluding the polyolefin part of the compatibiliser is from 50-90 wt. % on the basis of the total amount of the composition or the amount of polycarbonate is from 50-90 wt. % on the basis of the total amount of the composition.

4. The composition of claim 1, wherein the amount of compatibiliser is from 0.1-10 wt. %, on the basis of the total amount of the composition.

5. The composition of claim 1, wherein the polyolefin of the composition is:
   a propylene homopolymer,
   a propylene-α-olefin random copolymer,
   a propylene-α-olefin block copolymer,
   a hetero-phasic polypropylene copolymer comprising a matrix phase and a disperse phase, the matrix phase consisting of a propylene homopolymer and/or a propylene copolymer with up to 3 wt. % of ethylene and/or at least one $C_4$-$C_8$ α-olefin, the wt. % being based on the matrix phase, and the disperse phase consisting of an ethylene-$C_3$-$C_8$ α-olefin copolymer, or a mixture of any of the foregoing polypropylenes.

6. The composition of claim 1, wherein the polyolefin of the composition is a very low density polyethylene, linear low density polyethylene, low density polyethylene, high density polyethylene or a mixture of any of the foregoing polyethylenes.

7. The composition of claim 1, wherein the compatibiliser has a weight average molecular weight of from 1,000 to 250,000 g/mol.

8. The composition of claim 1, wherein in the compatibiliser the polyester is selected from one or more selected from the group consisting of β-butyrolactone, glycolide, L-lactide, ε-caprolactone, cyclic butylene adipate and cyclic ethylene brassylate.

9. The composition of claim 1, wherein the polyolefin part of the compatibiliser is a propylene homopolymer block.

10. An article comprising the composition of claim 1.

11. The article of claim 10, said article being selected from the group consisting of automotive interior articles, automotive exterior articles, household appliances, pipes, films, sheets.

12. The composition of claim 2, wherein the polyester has an average M/F ratio ≥3 and ≤7.

13. The composition of claim 4, wherein the amount of compatibiliser is from 3-8 wt. % on the basis of the sum of the amount of polypropylene and polyethylene.

14. The composition of claim 5, wherein the propylene-α-olefin random copolymer comprises a propylene ethylene or a propylene $C_4$-$C_8$ α-olefin random copolymer.

15. The composition of claim 1, wherein the polyolefin part of the compatibiliser is a propylene copolymer block containing at least 90 wt. % of polypropylene, on the basis of the weight of the polypropylene block.

16. A composition comprising:
   a very low density polyethylene, linear low density polyethylene, low density polyethylene, or a mixture of any of the foregoing polyethylenes,
   polycarbonate, and
   a compatibiliser, wherein said compatibiliser is a block copolymer comprising
      a polyolefin part comprising an ethylene copolymer containing at least 90 wt. % of ethylene on the basis of the weight of the polyethylene block, and
      a polyester part having an average M/F ratio ≥2 and ≤25, wherein M is the number of backbone carbon atoms in the polyester not including the carbonyl carbons and F is the number of ester groups in the polyester.

* * * * *